US012695731B2

(12) United States Patent
    Thankappan et al.

(10) Patent No.: US 12,695,731 B2
(45) Date of Patent: Jul. 28, 2026

(54) SYSTEMS AND METHODS FOR CLONING BMC PROFILES IN A CLUSTER ENVIRONMENT

(71) Applicant: Dell Products, L.P., Round Rock, TX (US)

(72) Inventors: Mini Thottunkal Thankappan, Bangalore (IN); Shinose Abdul Rahiman, Bangalore (IN); Rama Rao Bisa, Bangalore (IN); Dharma Bhushan Ramaiah, Bangalore (IN); Vineeth Radhakrishnan, Palakkad (IN)

(73) Assignee: Dell Products L.P., Round Rock, TX (US)

( * ) Notice: Subject to any disclaimer, the term of this patent is extended or adjusted under 35 U.S.C. 154(b) by 262 days.

(21) Appl. No.: 18/177,249

(22) Filed: Mar. 2, 2023

(65) Prior Publication Data

US 2024/0297871 A1     Sep. 5, 2024

(51) Int. Cl.
    *H04L 9/40*          (2022.01)
(52) U.S. Cl.
    CPC ........ *H04L 63/0428* (2013.01); *H04L 63/102* (2013.01); *H04L 63/166* (2013.01)
(58) Field of Classification Search
    CPC . H04L 63/0428; H04L 63/0823; H04L 63/10; H04L 63/102; H04L 63/106; H04L 63/16; H04L 63/162; H04L 63/164; H04L 63/166; H04L 63/168; H04L 9/0816
    See application file for complete search history.

(56) References Cited

U.S. PATENT DOCUMENTS

| | | | | |
|---|---|---|---|---|
| 8,510,571 | B1* | 8/2013 | Chang | G06F 21/604 |
| | | | | 713/188 |
| 10,313,261 | B1* | 6/2019 | Walton, III | H04L 41/145 |
| 2008/0151866 | A1* | 6/2008 | Wu | H04L 65/1059 |
| | | | | 370/352 |
| 2008/0168271 | A1* | 7/2008 | Sherburne | H04L 41/0843 |
| | | | | 713/171 |
| 2014/0204803 | A1* | 7/2014 | Nguyen | H04L 67/51 |
| | | | | 370/255 |
| 2016/0306644 | A1* | 10/2016 | Kelly | G06F 9/5044 |
| 2018/0270232 | A1* | 9/2018 | Conrad | H04L 63/0428 |
| 2019/0324769 | A1* | 10/2019 | Ganesan | G06F 9/4408 |
| 2020/0135333 | A1* | 4/2020 | Becker | G16H 40/40 |
| 2020/0412701 | A1* | 12/2020 | Atta | H04L 9/3247 |

(Continued)

*Primary Examiner* — Kostas J Katsikis
(74) *Attorney, Agent, or Firm* — Fogarty LLP

(57)          ABSTRACT

According to embodiments of the present disclosure, a firmware cloning system and method provided using Security Protocol and Data Model (SPDM)-enabled devices. The firmware cloning system and method include program instructions that may be executed on a processing system to mutually authenticate with a source IHS to generate shared security keys, and end a request to the source IHS to generate a server profile comprising information associated with a configuration of the source HIS. A source HIS is configured to generate the server profile in response to the request, encrypt the server profile using one of the security keys, and send the encrypted server profile to the target HIS. The target HIS then is configured to receive the encrypted server profile, decrypt the encrypted server profile using a source of the shared security keys, and configure the target IHS according to the decrypted server profile.

20 Claims, 3 Drawing Sheets

(56)         References Cited

U.S. PATENT DOCUMENTS

2022/0012095 A1* 1/2022 Ylinen ................. G06F 9/4843
2023/0367575 A1* 11/2023 Izzo ....................... H04L 9/088
2024/0134625 A1* 4/2024 Xie ...................... G06F 9/4451
2024/0134775 A1* 4/2024 Jo ....................... G06F 11/3419

* cited by examiner

SYSTEMS AND METHODS FOR CLONING BMC PROFILES IN A CLUSTER ENVIRONMENT

BACKGROUND

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

Communication networks, and in particular the Internet, has revolutionized the manner in which software is updated on a computer system. Prior to the advent of the Internet, a software provider would package the update on computer readable media, and the computer owner had to obtain a copy of the media to complete the update in order to make the software update accessible to the user of the computer system. However, distributing software updates on computer readable media was often expensive for software providers, which tended to restrict the number of software updates that a software provider would issue. As a consequence, substantial time would pass between updates, and consumers had to manage certain known issues for these time periods, at least until an update became available. Another aspect of this older method was that many modifications were packaged into a single update to reduce the costs associated with distributing the update.

Security Protocol and Data Model (SPDM)-based attestation, which has been published by the Platform Management Components Intercommunication (PMCI) Working Group of the Distributed Management Task Force (DMTF), generally involves a security mechanism to remotely detect an adversarial presence on a device to guarantee the device's trustworthiness. Attestation runs as a two-party security scheme in which a trusted party (e.g., the requesting device) assures the integrity of the untrusted remote device (e.g., the responding device). A requesting device, using this scheme, can determine the identity of a device and/or the firmware/software that the device is running. The responding device may send proof about its current state using a cryptographic hash to the requesting device. The requesting device may then evaluate the received evidence with the expected legitimate state of the responding device, and validate whether or not the responding device is trustworthy or not. Many system-on-chip (SOC) platforms now use SPDM-based attestation due in large part, to its light weight and high levels of security provided thereby.

SUMMARY

According to embodiments of the present disclosure, a firmware cloning system and method provided using Security Protocol and Data Model (SPDM)-enabled devices. The firmware cloning system and method include program instructions that may be executed on a processing system to mutually authenticate with a source IHS to generate shared security keys, and end a request to the source IHS to generate a server profile comprising information associated with a configuration of the source HIS. A source HIS is configured to generate the server profile in response to the request, encrypt the server profile using one of the security keys, and send the encrypted server profile to the target HIS. The target HIS then is configured to receive the encrypted server profile, decrypt the encrypted server profile using a source of the shared security keys, and configure the target IHS according to the decrypted server profile.

According to another embodiment, a server profile cloning method includes the steps of mutually authenticating, by a target IHS, a source IHS to generate shared security keys, sending, by the target IHS, a request to the source IHS to generate a server profile comprising information associated with a configuration of the source HIS, and generating, by the source IHS, the server profile in response to the request, encrypting the server profile using one of the security keys, and sending the encrypted server profile to the target HIS. The method further includes the steps of receiving, by the target IHS, the encrypted server profile, decrypting, by the target IHS, the encrypted server profile using a source of the shared security keys, and configuring the target IHS according to the decrypted server profile.

According to yet another embodiment, a computer program product includes computer-executable instructions to mutually authenticate with a source IHS to generate shared security keys, and send a request to the source IHS to generate a server profile comprising information associated with a configuration of the source HIS. The source IHS is configured to generate the server profile in response to the request, and encrypt the server profile using one of the security keys, and send the encrypted server profile to the target HIS. The instructions may be further executed to receive the encrypted server profile, decrypt the encrypted server profile using a source of the shared security keys, and configure the target IHS according to the decrypted server profile.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Figure 1:
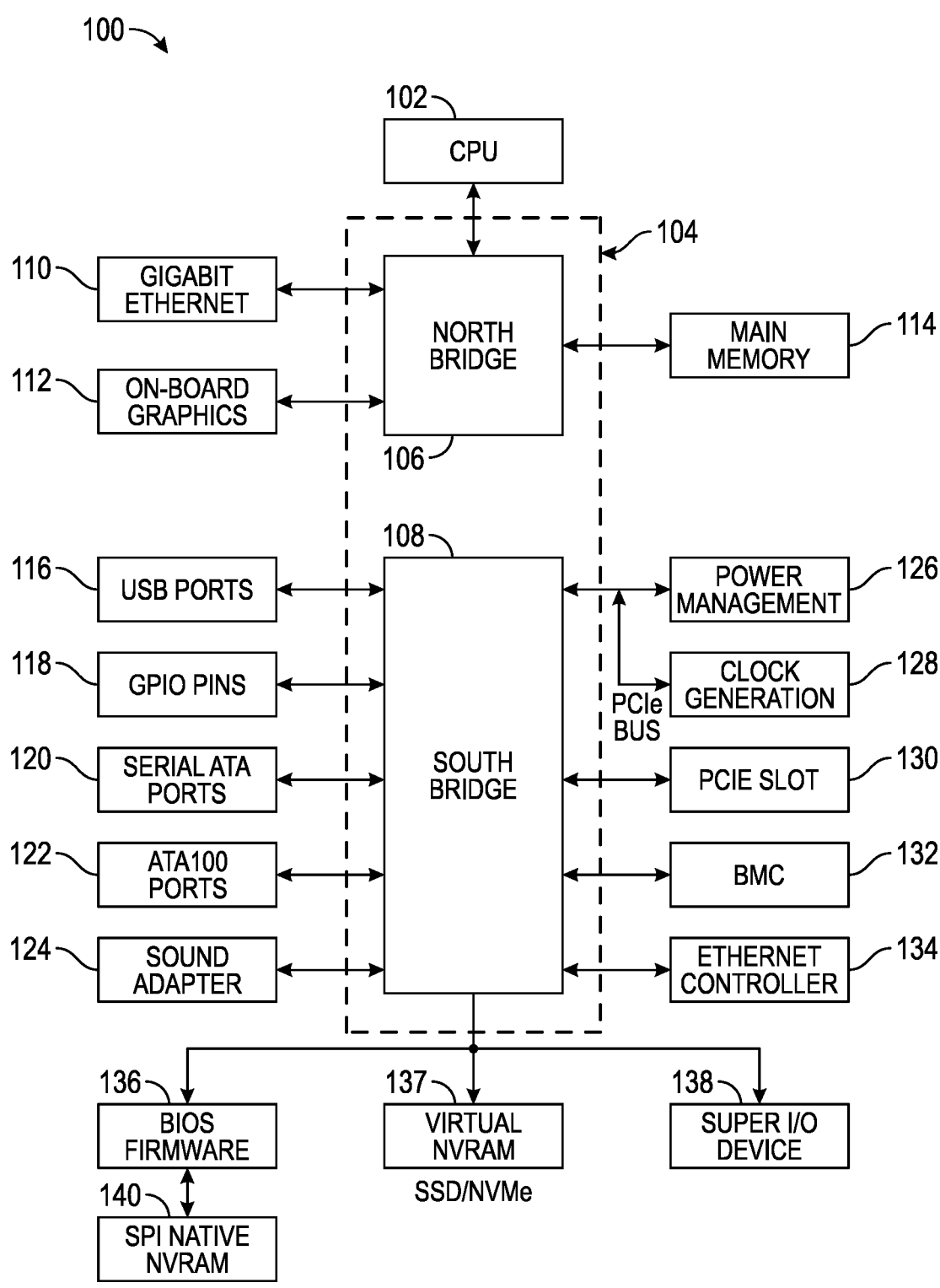
FIG. 1 shows an example of an Information Handling System (IHS) that may be configured to implement a system and method for collective attestation according to one embodiment of the present disclosure.

The present disclosure is described with reference to the attached figures. The figures are not drawn to scale, and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below.

Certain IHSs may be configured with BMCs that are used to monitor, and in some cases manage computer hardware components of their respective IHSs. A BMC is normally programmed using a firmware stack that configures the BMC for performing out-of-band (e.g., external to a computer's operating system or BIOS) hardware management tasks. The BMC firmware can support industry-standard Specifications, such as the Intelligent Platform Management Interface (IPMI) and Systems Management Architecture of Server Hardware (SMASH) for computer system administration.

Baseboard management controllers (BMCs) are particularly well suited for the features provided by the Security Protocol and Data Model (SPDM) specification. The SPDM specification has been published by the Platform Management Components Intercommunication (PMCI) Working Group of the Distributed Management Task Force (DMTF). A particular goal of the SPDM specification is to facilitate secure communication among the devices of a platform management subsystem. Examples of a platform management subsystem may include an Information Handling System (IHS), such as a desktop computer, laptop computer, a cellular telephone, a server, and the like.

The SPDM specification defines messages and procedures for secure communication among hardware devices, which includes authentication of hardware devices and session key exchange protocols to provide secure communication among those hardware devices. Management Component Transport Protocol (MCTP) Peripheral Component Interconnect Express (PCIe) vendor defined message (VDM) channels, which supports peer-to-peer messaging (e.g., route by ID), allow a SPDM-enabled hardware device to issue commands to other SPDM-enabled hardware devices within a secure communication channel.

Cyber attackers are reportedly exploiting and abusing devices, such as platform interface protocol analyzers to steal unencrypted information, spy on network traffic, and gather information to leverage in future attacks against platform components and component interfaces (e.g., I2C, PCIe, I3C, Sensewire, SPI, etc.) of an IHS. Detection of vulnerable platform components is not an easy task, and exploiting unpatched vulnerabilities could allow the attacker to take control of the IHS. Some example platform security risks may include compromised security in which hostile component insertion and/or compromised firmware updates can cause supply chain security issues. Another example platform security risk may include confidentiality and integrity risks in which data transfers that are unencrypted may be vulnerable to eavesdropping, stealing, and tampering. Additionally, non-compliant security configuration errors, certificate management, platform security trust, and the like could lead to non-compliance with industry standard security policies. The DMTF SPDM specifications have been developed to alleviate such problems and reduce management overhead in maintaining and establishing the platform security within the IHS infrastructure domain.

Within this disclosure the configuration of a server refers to a number and type of hardware devices in the IHS as well as the settings for each of those hardware devices and of the server's main components, such as motherboard settings, BIOS settings, and the like. BMCs typically provide means to export a server profile associated with the existing configuration of a server (e.g., IHS). The exported server profile can then be applied to an existing or new target server. Conventionally, the BMC generates a Server Configuration Profile (SCP) that can be used store the server profile so that it can be exported and/or imported to or from other servers. A drawback of the conventional SCP is that it stores the server profile in a plain text format (i.e., in the clear). Nevertheless, storing the server profile in plain text format presents several problems. For example, user settings including passwords (hash values) are exported in plain text format. Additionally, a low level of confidence in the integrity of the information stored in the server profile may exist because it can be easily modified. That is, the BMC on which these settings are being imported to does not know if the configuration has been tampered with or not. For another example, a user (e.g., Administrator of the server) may be required to apply these settings manually on each of the servers in a clustered environment. Embodiments of the present disclosure provide a solution to these problems, among others, by providing a system and method for cloning BMC profiles in a cluster environment that causes a target server to mutually authenticate with a source IHS, and uses security keys generated according to the mutual authentication process to encrypt the server profile at the source server, and decrypt it at the target server so that the integrity and security of information in the server profile remains intact.

FIG. 1 shows an example of an IHS 100 that may be configured to implement embodiments described herein. It should be appreciated that although certain embodiments described herein may be discussed in the context of a desktop or server computer, other embodiments may be utilized with virtually any type of IHS 100. Particularly, the IHS 100 includes a baseboard or motherboard, to which is a printed circuit board (PCB) to which components or devices are mounted by way of a bus or other electrical communication path. For example, Central Processing Unit (CPU) 102 operates in conjunction with a chipset 104. CPU 102 is a processor that performs arithmetic and logic necessary for the operation of the IHS 100.

Chipset 104 includes northbridge 106 and southbridge 108. Northbridge 106 provides an interface between CPU 102 and the remainder of the IHS 100. Northbridge 106 also provides an interface to a random access memory (RAM) used as main memory 114 in the IHS 100 and, possibly, to on-board graphics adapter 112. Northbridge 106 may also be configured to provide networking operations through Ethernet adapter 110. Ethernet adapter 110 is capable of connecting the IHS 100 to another IHS 100 (e.g., a remotely located IHS) via a network. Connections which may be made by Ethernet adapter 110 may include local area network (LAN) or wide area network (WAN) connections. Northbridge 106 is also coupled to southbridge 108.

Southbridge 108 is responsible for controlling many of the input/output (I/O) operations of the IHS 100. In particular, southbridge 108 may provide one or more universal serial bus (USB) ports 116, sound adapter 124, Ethernet controller 134, and one or more general purpose input/output (GPIO) pins 118. Southbridge 108 may also provide a bus for interfacing peripheral card devices such as PCIe slot 130. In some embodiments, the bus may include a peripheral component interconnect (PCI) bus. Southbridge 108 may also provide baseboard management controller (BMC) 132 for use in managing the various components of the IHS 100. Power management circuitry 126 and clock generation circuitry 128 may also be utilized during operation of southbridge 108.

Additionally, southbridge 108 is configured to provide one or more interfaces for connecting mass storage devices to the IHS 100. For instance, in an embodiment, southbridge 108 may include a serial advanced technology attachment (SATA) adapter for providing one or more serial ATA ports 120 and/or an ATA 100 adapter for providing one or more ATA 100 ports 122. Serial ATA ports 120 and ATA 100 ports 122 may be, in turn, connected to one or more mass storage devices storing an operating system (OS) and application programs.

An OS may comprise a set of programs that controls operations of the IHS 100 and allocation of resources. An application program is software that runs on top of the OS and uses computer resources made available through the OS to perform application-specific tasks desired by the user.

Mass storage devices connected to southbridge 108 and PCIe slot 130, and their associated computer-readable media provide non-volatile storage for the IHS 100. Although the description of computer-readable media contained herein refers to a mass storage device, such as a hard disk or CD-ROM drive, it should be appreciated by a person of ordinary skill in the art that computer-readable media can be any available media on any memory storage device that can be accessed by the IHS 100. Examples of memory storage devices include, but are not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices.

A low pin count (LPC) interface may also be provided by southbridge 108 for connecting Super I/O device 138. Super I/O device 138 is responsible for providing a number of I/O ports, including a keyboard port, a mouse port, a serial interface, a parallel port, and other types of input/output ports.

The LPC interface may connect a computer storage media such as a ROM or a flash memory such as a non-volatile random access memory (NVRAM) for storing BIOS/firmware 136 that includes BIOS program code containing the basic routines that help to start up the IHS 100 and to transfer information between elements within the IHS 100. BIOS/firmware 136 comprises firmware compatible with the Extensible Firmware Interface (EFI) Specification and Framework.

The LPC interface may also be utilized to connect virtual NVRAM 137 (e.g., SSD/NVMe) to the IHS 100. The virtual NVRAM 137 may be utilized by BIOS/firmware 136 to store configuration data for the IHS 100. In other embodiments, configuration data for the IHS 100 may be stored on the same virtual NVRAM 137 as BIOS/firmware 136. The IHS 100 may also include a SPI native NVRAM 140 coupled to the BIOS 136.

BMC 132 may include non-volatile memory having program instructions stored thereon that enable remote management of the IHS 100. For example, BMC 132 may enable a user to discover, configure, and manage the IHS 100, setup configuration options, resolve and administer hardware or software problems, etc. Additionally or alternatively, BMC 132 may include one or more firmware volumes, each volume having one or more firmware files used by the BIOS' firmware interface to initialize and test components of the IHS 100.

As a non-limiting example of BMC 132, the integrated DELL Remote Access Controller (iDRAC) from DELL, INC. is embedded within DELL POWEREDGE servers and provides functionality that helps information technology (IT) administrators deploy, update, monitor, and maintain servers with no need for any additional software to be installed. The iDRAC works regardless of OS or hypervisor presence from a pre-OS or bare-metal state because iDRAC is embedded within the IHS 100 from the factory.

It should be appreciated that, in other embodiments, the IHS 100 may comprise other types of computing devices, including hand-held computers, embedded computer systems, personal digital assistants, and other types of computing devices. It is also contemplated that the IHS 100 may not include all of the components shown in FIG. 1, may include other components that are not explicitly shown in FIG. 1, or may utilize a different architecture.

According to embodiments of the present disclosure, the IHS 100 may support SPDM in which the BMC 132 manages the operation of one or more managed devices configured in the IHS 100. The SPDM specification provides for secure communication between the BMC 132 and the managed devices in the IHS 100. To meet this goal, the SPDM specification facilitates certificate chains that are stored in up to eight slots. Slot 0 is a default slot that is always used, while the other slots (e.g., slots 1-7) may be allocated for use by the administrator of the IHS 100. The SPDM spec also provides a slot mask that identifies each certificate chain.

Figure 2:
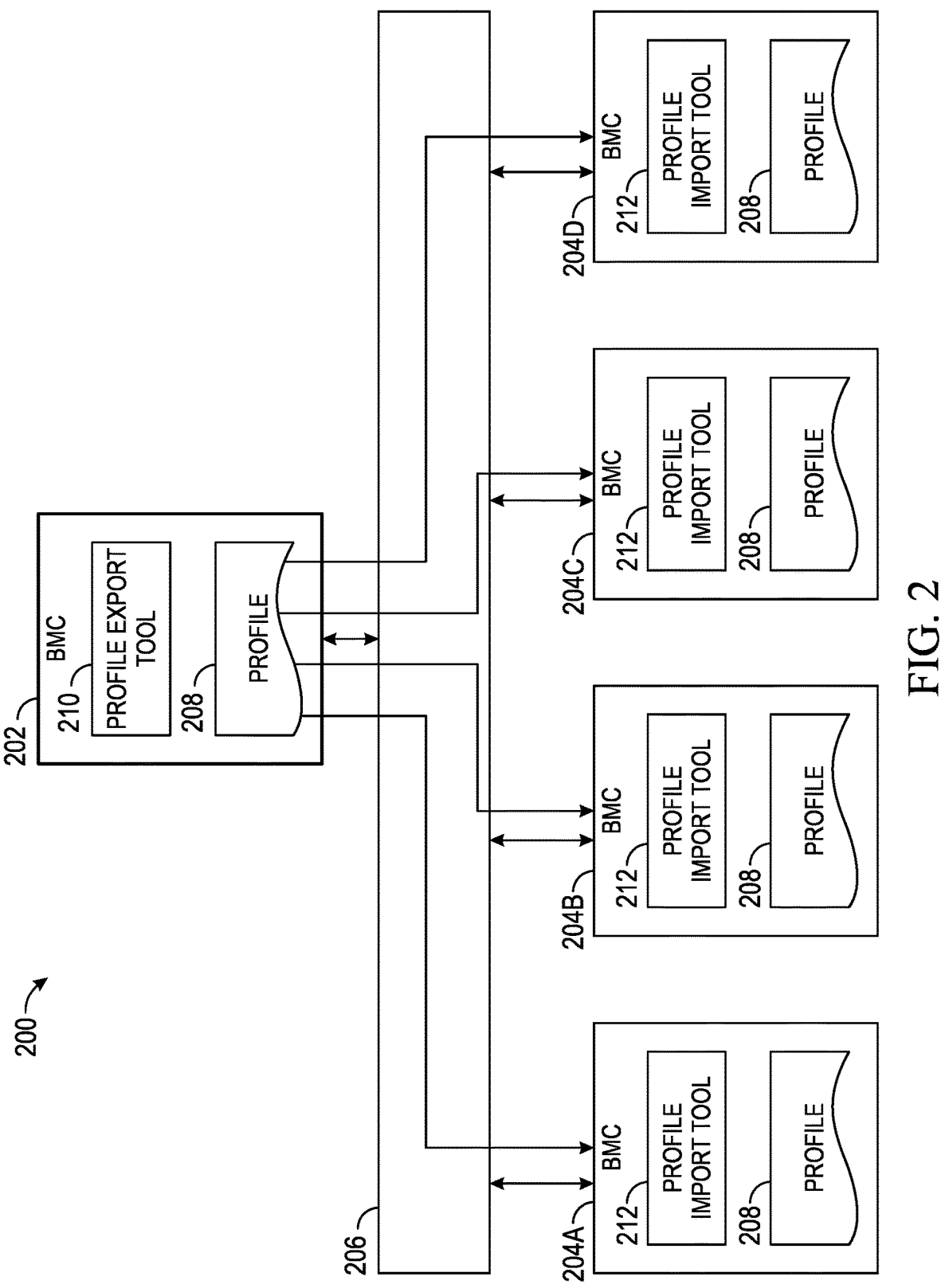
FIG. 2 illustrates an example server profile cloning system according to one embodiment of the present disclosure.

FIG. 2 illustrates an example server profile cloning system 200 according to one embodiment of the present disclosure. The server profile cloning system 200 includes a source server 202 and one or more target servers 204 that communicate over a network 206, which may be any suitable type, such as a local area network (LAN) or a Wide Area Network (WAN) (e.g., the Internet). The source server 202 stores and executes a profile export tool 210 that may be used to generate a server profile 208, encrypt the server profile 208, and send it to the target servers 204 over the network 206. Each of the target servers 204 stores and executes a profile import tool 212 that receives the encrypted profile 208, decrypts the encrypted server profile to recover the server profile 208 in the clear, and configures its respective target server 204 according to the recovered server profile 208.

In certain cases, the source server 202 may be considered to be golden in that its configuration is to be propagated to other servers in a cluster, such as a data center. For example, the source server 202 may be continually updated with some, most, or all of the latest software and firmware updates so that when a new group of servers are deployed into the cluster, their configuration may be made to match that of the 'golden' source server 202, and also have some, most, or all of the latest software and/or firmware updates.

Because the server profile 208 is encrypted during transit, the security of sensitive information (e.g., passwords, public/private keys, proprietary configurations, etc.) in the server profile 208 can be maintained. Additionally, encrypting the server profile 208 may enhance confidence that the information in the server profile 208 has not been inadvertently or maliciously modified. In one embodiment, the profile export tool 210 and profile import tool 212 may encrypt and decrypt the server profile 208 using shared security keys that were generated according to a mutual authentication process. In another embodiment, security of the server profile 208 may be enhanced by performing the server profile cloning system 200 while the target servers 204 are being booted; that is, before their respective Operating Systems (Oss) are allowed to start. For example, the server profile cloning system 200 may be performed while the BIOS firmware 136 of each target server 204 has control of its respective target server 204.

In one embodiment, execution of the profile export tool 210 and/or profile import tool 212 may be administered by the BIOS firmware 136 of their respective source server 202 or target server 204. In another embodiment, execution of the profile export tool 210 and/or profile import tool 212 may be performed by a BMC 132 configured in each of the source server 202 and/or target server 204. For example, the profile export tool 210 may communicate with the profile import tool 212 using a secure communication session established according to the SPDM protocol in which the secure communication session is established via a mutual authentication process where public and private security keys are generated and shared between the profile export tool 210 and profile import tool 212. In one embodiment, the server profile 208 may be encrypted using a private key of the BMC 132 of the source server 202 and decrypted using a public key of the BMC 132 of the source server 202 that was previously shared with the target server 204. In another embodiment, the server profile 208 may be stored in secure portion of the memory of the source server 202 to provide for data-at-rest protection. Security measures such as described above may provide for enhanced security of the server profile 208 and to ensure its integrity from being inadvertently or illicitly modified.

Figure 3:
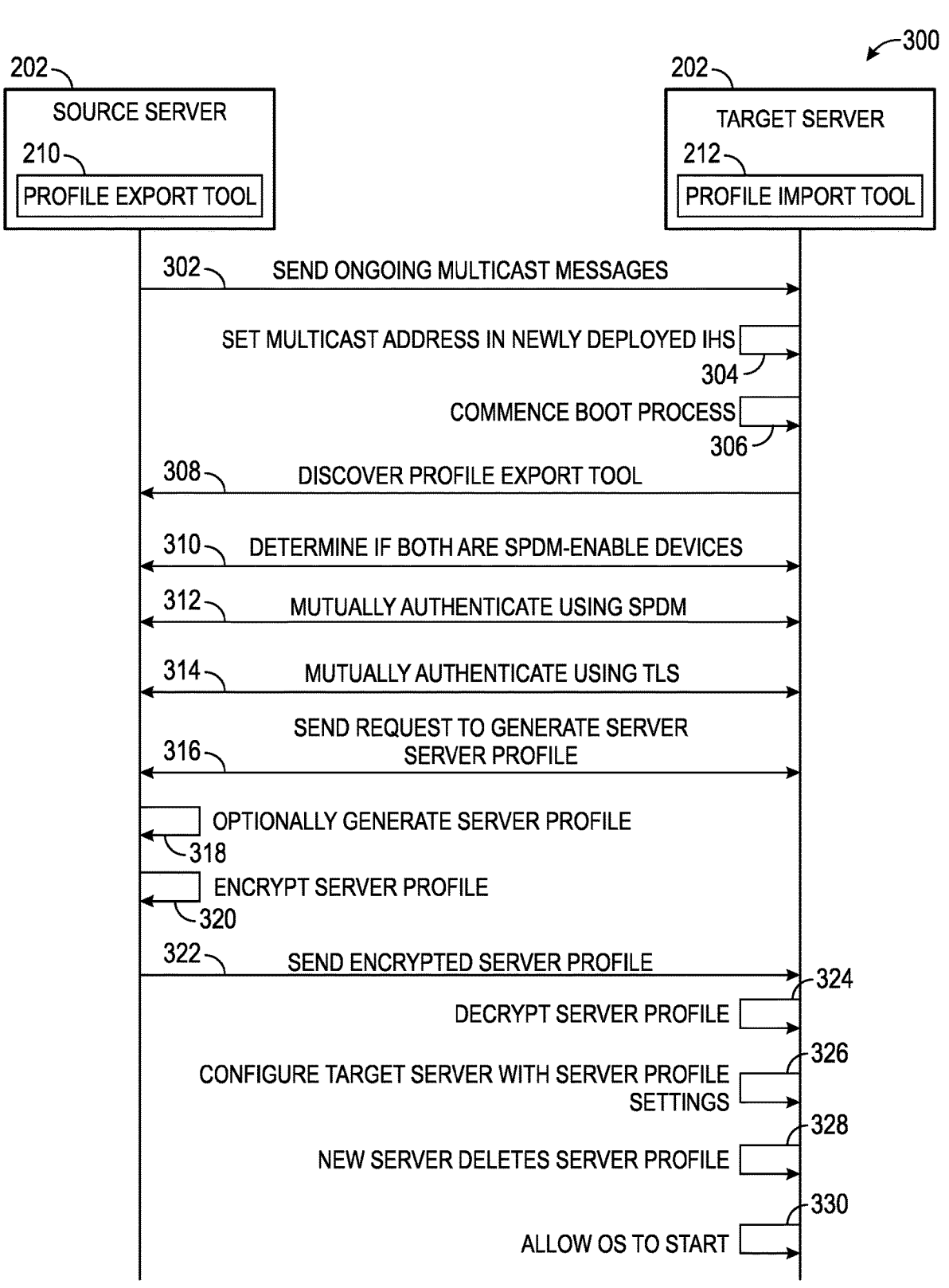
FIG. 3 illustrates an example flow diagram of a server profile cloning method showing how the profile import tool may communicate with the profile export tool to clone the configuration of the source server with the target server according to one embodiment of the present disclosure.

FIG. 3 illustrates an example flow diagram of a server profile cloning method 300 showing how the profile import tool 212 may communicate with the profile export tool 210 to clone the configuration of the source server 202 with the target server 204 according to one embodiment of the present disclosure. Additionally or alternatively, the server profile cloning method 300 may be performed at least in part, by the server profile cloning system 200 as described herein above with reference to FIG. 2. The server profile cloning method 300 may be performed at any suitable time, such as whenever it is desired to clone a configuration of the target server 204 with the source server 202. For example, the server profile cloning method 300 may be performed when multiple target servers 204 are newly deployed in a data center, and turned up for use with the existing servers in the data center.

Initially at step 302, the source server 202 sends ongoing multicast messages to the target servers 204. For example, the source server 202 may be configured with a multicast address to be used for sending the multicast messages at ongoing intervals (e.g., once each minute) such that, when a target server 204 is initially connected to the network 206, it may commence the server profile cloning method 300 described herein. In one embodiment, the BMC 132 configured in the source server 202 may be configured with the multicast address, and used for sending the multicast messages at ongoing intervals.

At step 304, the multicast address is provisioned in the target server 204. In one embodiment, the cluster may be configured with multiple source servers 202, each with a different configuration so that each target server 204 may be provisioned with a different configuration based upon which multicast address is provisioned in the target server 204. For example, an administrator may desire to have a group of target servers 204 with a first configuration optimized for storage capabilities, and have a second group of target servers 204 with a second configuration optimized for enhanced compute capabilities. In such a case, the administrator may deploy a first source server 202 with a configuration optimized for storage capabilities, and deploy a second source server 202 with a configuration optimized for its compute capabilities, and provision a different multicast address in each so that selective ones a group of target servers 204 may be cloned with the first source server 202, and other ones of the group of target servers 204 cloned with the second source server 202.

At step 306, the target server 204 commences a boot-up process. In one embodiment, a flag may be set in the target server 204 or profile import tool 212 to inhibit the Operating System (OS) of the target server 204 from being started until its configuration is cloned with that of the source server 202. In one embodiment, the profile import tool 212 may be configured to wait for receipt of the multicast message from the profile export tool 210. In a particular embodiment in which the profile import tool 212 is executed by a BMC 132, certain steps of the server profile cloning method 300 described herein may be performed during a lights-out phase of the target server 204 in which the BMC 132 is running while the other devices in the target server 204 are powered down or powered in a limited failsafe mode of operation.

At step 308, the profile import tool 212 discovers the profile export tool 210 configured in the source server 202. In one embodiment, the profile import tool 212 discovers the profile export tool 210 by detecting the multicast message. In other embodiments, the profile import tool 212 may discover the profile export tool 210 using any suitable technique, such as by manually configuring the multicast address in the profile import tool 212. The profile export tool 210 and/or profile import tool 212 determines whether the platforms they both are executed on (e.g., BMCs configured in the source server 202 and target server 204) are SPDM-enabled devices at step 310. If so, both the profile export tool 210 and profile import tool 212 mutually authenticate one another using SPDM at step 312; otherwise both the profile export tool 210 and profile import tool 212 mutually authenticate one another using TLS at step 314. As a result of either authentication process (e.g., SPDM or TLS), the profile import tool 212 provide its public security key to profile export tool 210 in the source server 202.

At step 316, the profile import tool 212 sends a request to the profile export tool 210 to generate a server profile 208. In one embodiment, profile export tool 210 may perform a discovery of the configuration of the source server 202, and generate a new server profile only if changes have been made to the source server's configuration since the last time that the server profile was generated. In another embodiment, the profile export tool 210 may generate a new server profile only if a certain amount of time (e.g., 30 minutes, 1 hour, 3 hours, etc.) has elapsed since the last time the server profile 208 was generated. Such behavior may be useful for cases where multiple target servers 204 are being cloned at or close to the same time. Thereafter at step 318, the profile export tool 210 optionally generates the server profile 208, such as based upon the aforementioned criteria. The profile export tool 210 then encrypts the generated server profile 208 using the public security key it obtained at step 320, and sends the server profile 208 to the target server 204 at step 322.

At step 324, the profile import tool 212 decrypts the encrypted server profile 208 such as, by using the private security key of the target server 204. In one embodiment, the decrypted server profile 208 is temporarily stored in a secure portion of the memory of the BMC 132. The profile import tool 212 then provisions the target server 204 with the settings stored in the decrypted server profile 208 at step 326, deletes the decrypted server profile 208 at step 328, and allows the OS to start at step 330.

The steps described above may be repeated for each of a group of target servers 204. Nevertheless, when use of the server profile cloning method 300 is no longer needed or desired, the method 300 ends.

Although FIG. 3 describes an example method 300 that may be performed to clone one or more target servers 204, the features of the method 300 may be embodied in other specific forms without deviating from the spirit and scope of the present disclosure. For example, the method 300 may perform additional, fewer, or different operations than those described in the present examples, such as omitting step 318 if/when a group of target servers 204 are being clone at or about the same time. For another example, the method 300 may be performed in a sequence of steps different from that described above. As yet another example, certain steps of the method 300 may be performed by other components than those described above, such as by the BIOS configured in the IHS 100.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," when used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A target Information Handling System (IHS) comprising:
   at least one memory coupled to at least one processor, the at least one memory having program instructions stored thereon that, upon execution by the at least one processor, cause the target IHS to:
      receive a multicast message transmitted from one of a plurality of source IHSs that are each configured to transmit a multicast message with a different address relative to the multicast message transmitted by other source IHSs, wherein the target IHS has been previously provisioned with the address associated with the one source IHS;
      when the address provisioned in the target IHS matches the address of the transmitted multicast message, mutually authenticate with a source IHS to generate shared security keys;
      send a request to the one source IHS to generate a server profile comprising information associated with a configuration of the one source IHS, wherein the information comprises a number and type of hardware devices in the one source IHS and one or more settings for each of the hardware devices and one or more latest software deployments or firmware updates existing on the one source IHS, and wherein the one source IHS is configured to generate the server profile in response to the request, encrypt the server profile using one of the security keys, and send the encrypted server profile to the target IHS;

receive the encrypted server profile;

decrypt the encrypted server profile using the shared security keys; and configure the target IHS according to the decrypted server profile.

2. The target IHS of claim 1, wherein the program instructions, upon execution, further cause the target IHS to, before mutually authenticating with the one source IHS, performing a discovery operation to identify a multicast address of the one source IHS.

3. The target IHS of claim 2, wherein the program instructions, upon execution, further cause the one source IHS to transmit the multicast address over a network at ongoing intervals.

4. The target IHS of claim 1, wherein the program instructions, upon execution, further cause the target IHS to mutually authenticate with the one source IHS using at least one of Security Protocol and Data Model (SPDM) messages or Transport Layer Security (TLS) messages.

5. The target IHS of claim 4, wherein the program instructions, upon execution, further cause the target IHS to mutually authenticate with the one source IHS using TLS messages when a platform that executes the instructions is not a SPDM-enabled device.

6. The target IHS of claim 5, wherein the platform comprises a Baseboard Management Controller (BMC) configured in the target IHS.

7. The target IHS of claim 1, wherein the program instructions, upon execution, further cause the target IHS to delete the server profile after the target IHS is configured according to the decrypted server profile.

8. The target IHS of claim 1, wherein the program instructions, upon execution, further cause the one source IHS to generate the server profile only when no changes have been made to the one source IHS since the server profile was previously generated.

9. The target IHS of claim 1, wherein the program instructions, upon execution, further cause the target IHS to mutually authenticate with the one source IHS, send the request to the one source IHS, receive the encrypted server profile, decrypt the encrypted server profile, and configure the target IHS during a boot operation of the target IHS.

10. The target IHS of claim 3, wherein the server profile comprises a Server Configuration Profile (SCP).

11. A server profile cloning method comprising:

receiving, by a target Information Handling System (IHS), a multicast message transmitted from one of a plurality of source IHSs that are each configured to transmit a multicast message with a different address relative to the multicast message transmitted by other source IHSs, wherein the target IHS has been previously provisioned with the address associated with the one source IHS;

when the address provisioned in the target IHS matches the address of the transmitted multicast message, mutually authenticating, by the target IHS, the one source IHS to generate shared security keys;

sending, by the target IHS, a request to the one source IHS to generate a server profile comprising information associated with a configuration of the one source IHS, wherein the information comprises a number and type of hardware devices in the one source IHS and one or more settings for each of the hardware devices and one or more latest software deployments or firmware updates existing on the one source IHS;

generating, by the one source IHS, the server profile in response to the request, encrypting the server profile using one of the security keys, and sending the encrypted server profile to the target IHS;

receiving, by the target IHS, the encrypted server profile;

decrypting, by the target IHS, the encrypted server profile using the shared security keys; and configuring the target IHS according to the decrypted server profile.

12. The server profile cloning method of claim 11, further comprising, before mutually authenticating with the one source IHS, performing a discovery operation to identify a multicast address of the one source IHS.

13. The server profile cloning method of claim 12, further comprising transmitting, by the one source IHS, the multicast address over a network at ongoing intervals.

14. The server profile cloning method of claim 11, further comprising mutually authenticating with the one source IHS using at least one of Security Protocol and Data Model (SPDM) messages or Transport Layer Security (TLS) messages.

15. The server profile cloning method of claim 14, further comprising mutually authenticating with the one source IHS using TLS messages when a platform that executes the instructions is not a SPDM-enabled device, wherein the platform comprises a Baseboard Management Controller (BMC) configured in the target IHS.

16. A computer program product comprising a non-transitory computer readable storage medium having program instructions stored thereon that, upon execution by a target Information Handling System (IHS), cause the target IHS to:

receive a multicast message transmitted from one of a plurality of source IHSs that are each configured to transmit a multicast message with a different address relative to the multicast message transmitted by other source IHSs, wherein the target IHS has been previously provisioned with the address associated with the one source IHS;

when the address provisioned in the target IHS matches the address of the transmitted multicast message, mutually authenticate with the one source IHS to generate shared security keys;

send a request to the one source IHS to generate a server profile comprising information associated with a configuration of the one source IHS, wherein the information comprises a number and type of hardware devices in the one source IHS and one or more settings for each of the hardware devices and one or more latest software deployments or firmware updates existing on the one source IHS, and wherein the one source IHS is configured to generate the server profile in response to the request, encrypt the server profile using one of the security keys, and send the encrypted server profile to the target IHS;

receive the encrypted server profile;

decrypt the encrypted server profile using the shared security keys; and configure the target IHS according to the decrypted server profile.

17. The computer program product of claim 16, wherein the program instructions, upon execution, further cause the target IHS to, before mutually authenticating with the one source IHS, perform a discovery operation to identify a multicast address of the one source IHS, wherein the one source IHS is configured to transmit the multicast address over a network at ongoing intervals.

18. The computer program product of claim 16, wherein the program instructions, upon execution, further cause the target IHS to mutually authenticate with the one source IHS using at least one of Security Protocol and Data Model (SPDM) messages or Transport Layer Security (TLS) messages.

19. The computer program product of claim 18, wherein the program instructions, upon execution, further cause the target IHS to mutually authenticate with the one source IHS using TLS messages when a platform that executes the instructions is not a SPDM-enabled device.

20. The computer program product of claim 19, wherein the platform comprises a Baseboard Management Controller (BMC) configured in the target IHS.

* * * * *